PRIOR ART

Greinacher – circuit

Circuit with several transformers

Symmetrical half wave circuit

Symmetrical full wave circuit

High Pass LC Filter

Transmission Line

United States Patent Office 3,539,903
Patented Nov. 10, 1970

3,539,903
CASCADE RECTIFIER VOLTAGE MULTIPLIER WITH RESONANCE COIL
Walter Goebel, 41 Honlestrasse, Munich 42, Germany
Filed Nov. 9, 1967, Ser. No. 681,744
Claims priority, application Germany, Nov. 9, 1966,
B 89,734
Int. Cl. H02m 3/18
U.S. Cl. 321—15                                            2 Claims

ABSTRACT OF THE DISCLOSURE

A cascade rectifier voltage multiplier having a high voltage transformer, two parallel columns of series connected capacitors coupled at one end to the transformer secondary winding, an equal number of rectifiers interconnecting the two columns to form a zig-zag ladder network, and a transverse coil connected between the two columns to form a series resonant circuit with the capacitors between it and the transformer having a frequency equal to the operating frequency.

---

This invention relates in general to cascade rectifier voltage multipliers, and more particularly to such circuits having at least one transverse coil forming a series LC circuit having a resonant frequency corresponding to the operating frequency of the device.

High voltage DC generators are used for producing high energy electrons or ions. One such device is the cascade type of high voltage DC generator, also known as the Greinacher or Cockcroft-Walton circuit, which is characterized by its high efficiency and stable output current. The cascade DC generator of Greinacher, shown in FIG. 1a, consists of a high voltage transformer, two columns of series connected capacitors C and an approximately equal number of rectifiers interconnecting the two columns to form a zig-zag ladder network. If $V_0$ is the peak value of the AC input voltage of the generator and $n$ represents the number of stages, the maximum DC output voltage $V_g$ of an ideal and nondissipative generator according to Greinacher, under no load conditions, is:

$$V_g = n \cdot V_0 \qquad (1)$$

The output voltage can not be arbitrarily increased by adding stages, however, without certain deleterious effects. As a consequence of the existing stray capacities in the circuit considerable reactive currents are developed. The stray capacities comprise the junction capacities of the rectifiers, the individual capacities interconnecting the capacitor columns and the capacities between the generator and external devices such as a pressure tank housing the circuit. The reactive currents, similar to the load current, produce voltage drops in the capacitors which decrease the transverse voltage in the single stages so that the output voltage $V_g$ according to Equation 1 cannot be obtained. (E. Everhardt, P. Lorraine: Rev. Sci. Instr., vol. 24, 1953, 3, p. 221–226). If a further load is applied to the generator it becomes even more difficult to raise the output voltage over a certain limit by increasing the number of stages.

In order to apply the Greinacher circuit of FIG. 1a to generators which have a higher number of stages to obtain a higher voltage multiplication factor with good efficiency and a tolerable amount of circuit elements, the following measures have been adopted in the past:

(a) Increasing the AC input voltage. This measure is limited by the break-through characteristics of the circuit elements involved and also results in exceptionally high and undesirable transverse voltages within the generator.

(b) Increasing the operating frequency. By this measure the load dependent voltage drop can be reduced but not the voltage drop due to the reactive currents.

(c) Increasing the value of the capacitors C. This measure increases the stored energy in the capacitors which is undesirable because heavy damages occur when sparks jump over to beam tubes, which is almost inevitable in high voltage devices.

(d) Using several high voltage feed points for the cascade generator at various stages, as shown in FIG. 1b. This can be achieved by using isolated transformer coils, laminated isolated transformer cores, or by special DC or AC generators driven by isolating shafts operating on the DC potential of the corresponding stage. Such generators, however, are very expensive and voluminous.

(e) Grounding the center tap of the transformer and adding a separate smoothing capacitor column, as shown in FIG. 1c. This measure reduces the ripple without obtaining a higher voltage at the grounded transformer core.

(f) Applying a full wave rectification by using twice the number of rectifiers, as shown in FIG. 1d. This reduces the load dependent voltage drop and the ripple.

(g) Inserting high voltage coils between the capacitor columns, as shown in FIG. 1e. Such coils compensate for the effects of the stray capacities and are tuned to them by a parallel resonant circuit.

(h) Designing the generator as a high pass LC filter, as shown in FIG. 1e, or as a transmission line, as shown in FIG. 1f. In these cases the line is terminated on its high voltage end either by a matching resistor (Journal Nuclear Energy, vol. 4, 1962, pp. 65–57) or by a suitably chosen inductance (E. Everhardt, P. Lorraine: Rev. Sci. Instr., vol. 24, 1953, 3, p. 221–226).

In all of these modified circuit arrangements the maximum voltage obtained may not exceed the theoretical level derived from Formula 1. In addition, they share the common disadvantage that the DC voltages per stage are not uniform and decrease at the higher stages, causing a nonlinear potential distribution along the two columns. Because of the load dependence of this nonlinearity single stages have to be designed, concerning their maximum dielectric strength, for the most unfavorable conditions. This requires an additional amount of space and increases the cost of the cascade generators.

The main object of the present invention is to minimize these disadvantages and to provide a high voltage cascade DC generator using a special circuit arrangement, whereby, without increasing the number of stages and the amplitude of the applied AC voltage, the magnitude of the DC voltage can be increased far above the value according to Formula 1.

A further object of the invention is to provide a cascade DC generator which exhibits a relatively linear potential distribution along the two columns, and has a low stored energy level.

The present invention consists of a high voltage transformer, two capacitor columns, rectifiers interconnecting the two columns and at least one transverse coil which forms a series resonant circuit together with the capacitors of the two columns between the coil and the transformer, having a resonant frequency equal to the operating frequency. It should be noted that due to the stray capacities it is difficult to calculate exactly the inductance of the coil.

In some cases it might be advantageous to use two or more resonant coils instead of one coil, whereby a system of coupling resonant circuits is obtained each having a certain number of assigned capacities. An additional advantage of the cascade DC generator according to the present invention is the fact that with good approximation the potential distribution is independent of the load and much more linear than in the coventional cascade DC generator. Further, since it is possible to use much smaller capacitors the stored energy is far lower, less than a tenth, compared with the conventional cascade DC generator under the same conditions of power output. It should be noted that the present invention is applicable to cascade generators with symmetrical or nonsymmetrical circuits.

In the drawings:

FIGS. 1a–f show six schematic circuit arrangements according to the prior art,

Figure 1A:
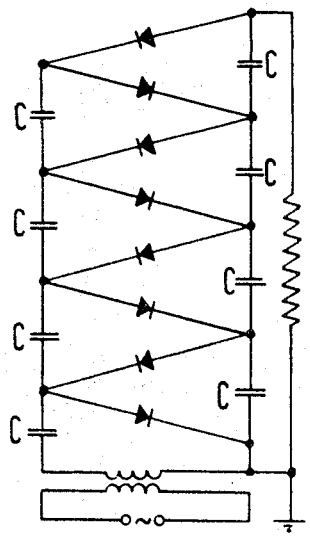
Figure 1B:
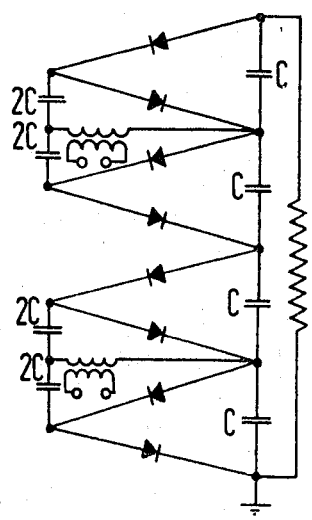
Figure 1C:
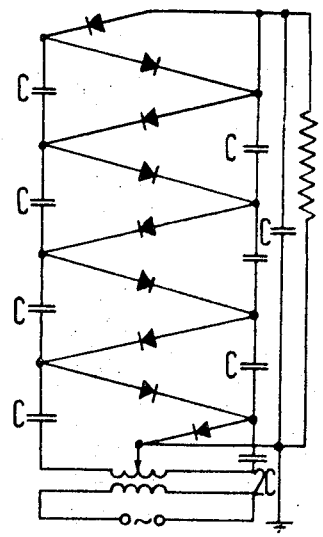
Figure 1D:
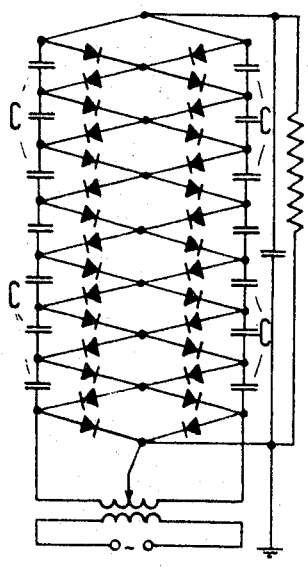
Figure 1E:
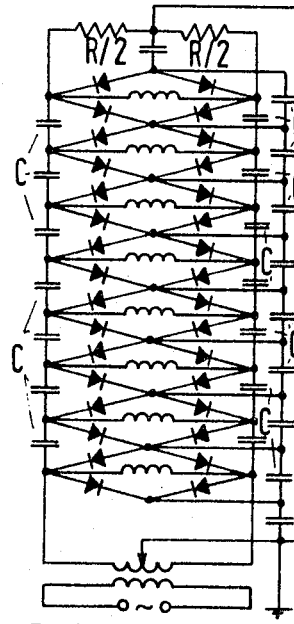
Figure 1F:
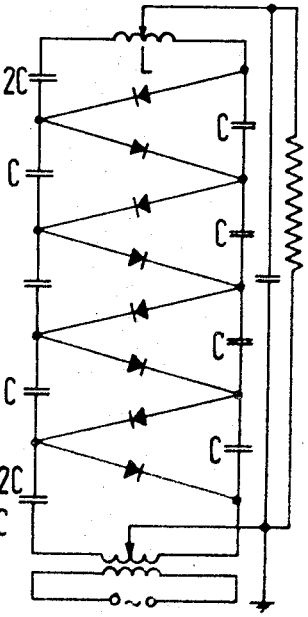
Figure 2:
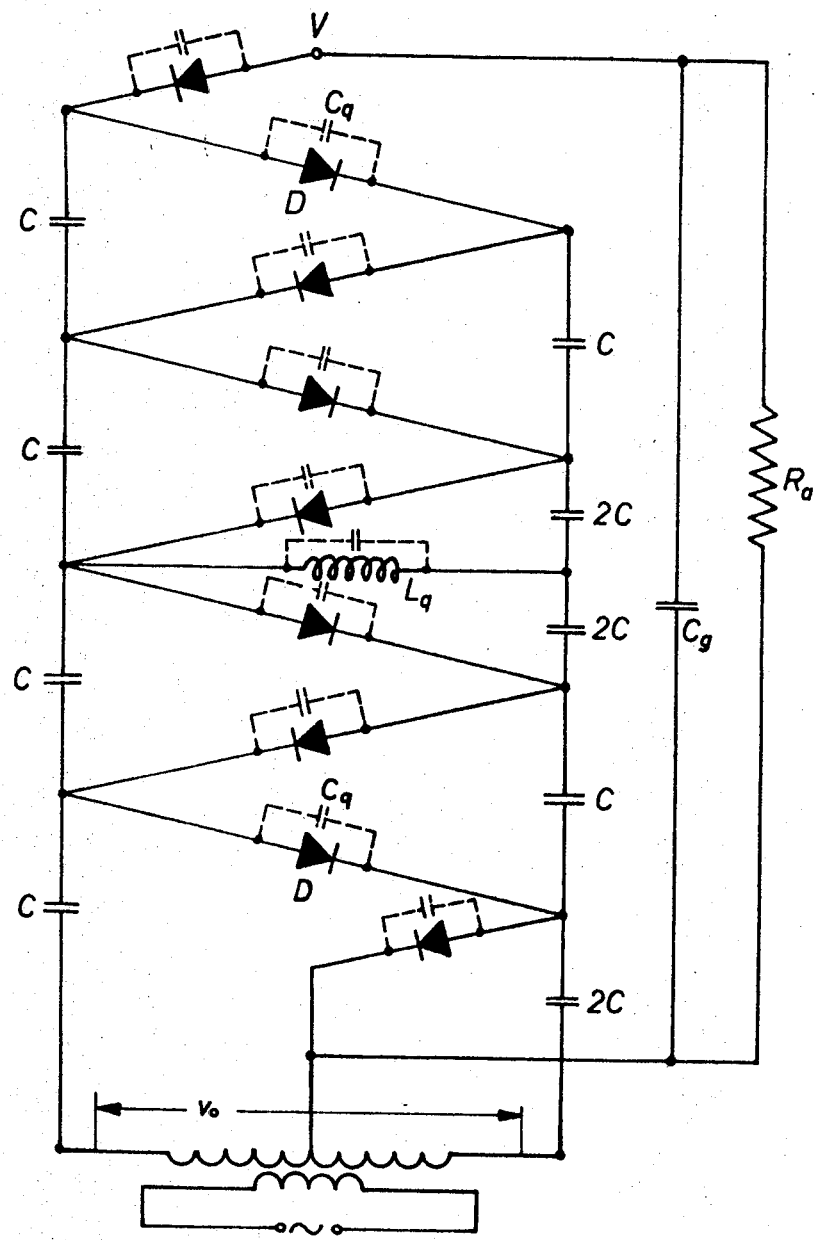
FIG. 2 shows one embodiment of the invention comprising 8 stages.

The cascade DC generator shown in FIG. 2 consists of two columns or series connected capacitors C, represented as 2C when the capacity has to have twice the normal value with only half the voltage on its terminals. The input AC power is produced by a transformer, the center tap of which is grounded. The rectification is performed by the rectifiers D interconnecting the two capacitor columns. Their equivalent capacity including all other stray capacities is represented by the parallel capacitors $C_g$ shown in dotted lines. The DC voltage output terminal is connected to a smoothing capacitor column $C_g$ and a load resistor $R_a$. According to the invention a transverse inductance coil $L_q$ is connected approximately in the middle of the cascade DC generator between the two columns. This coil together with the series connected capacitors C lying between the inductance coil and the transformer secondary coil forms a series resonant circuit. The necessary current limitation for the resonant circuit is obtained by the dissipation factor of the individual circuit elements and by the circuit damping due to the load resistor. In certain cases it might be advisable to use additional damping resistances, so that the current of the resonant circuit does not exceed certain values. Due to the present invention the inductance coil acts as an AC voltage source, by which means the upper stages are supplied with an additional transverse voltage.

Figure 3:
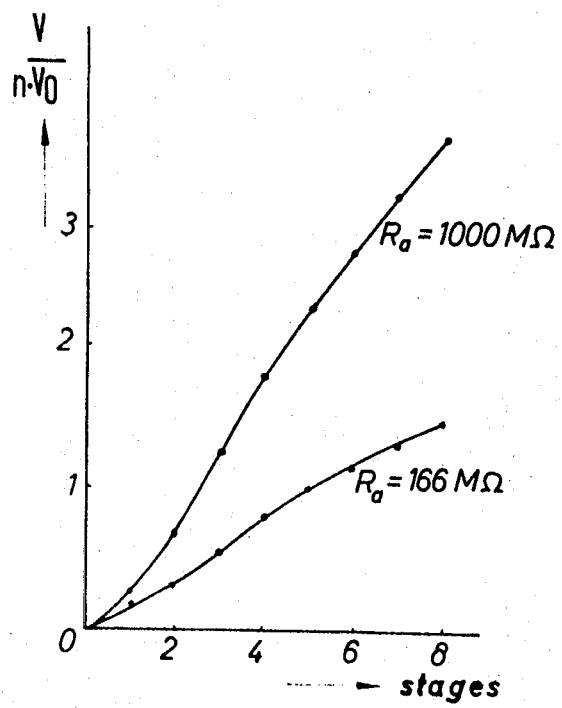
FIG. 3 shows the potential distribution along the columns of the embodiment acording to FIG. 2 with load resistors of 1000 and 166 M$\Omega$.

FIG. 3 shows an experimental potential distribution obtained with a special embodiment according to FIG. 2, whereby measurements were made along the two columns of the cascade DC generator having a load resistance $R_a$ of 160 and 1000 M$\Omega$. This figure was obtained by plotting the expressions $V/nV_0$ against the position on the two columns of the cascade generator, where V is the voltage measured at each stage, $n$ the total number of stages equal to 8 and $V_0$ the peak-value of the AC input voltage of the generator. As can be seen from the figure, the produced voltage increases almost linearly along the two capacitor columns, even when a heavy load resistance $R_a$ is applied. Further, since according to Equation 1 $nV_0$ corresponds to the theoretical output voltage $V_g$ of the Greinacher circuit, it can be seen that the output voltage of the generator of this invention at its eighth stage with a load resistance of 166 M$\Omega$ is bigger and with a load resistance of 1000 M$\Omega$ almost four times as big as the theoretical output voltage $V_g$ of a Greinacher generator with no load applied.

Figure 4:
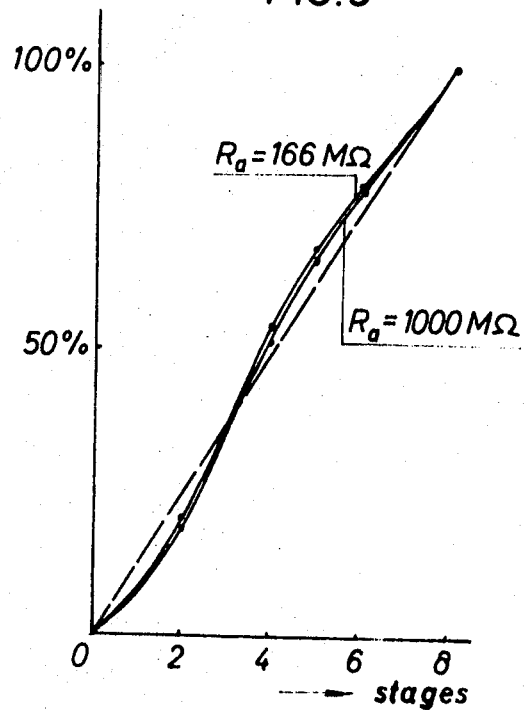
FIG. 4 shows the same two curves as FIG. 3 normalized at 100%.

FIG. 4 shows the same potential distribution as FIG. 3 with the exception that the voltage ratio $V/nV_0$ at the last stage is normalized to 100%. It can be seen that when using the teachings of the present invention linearity can be achieved almost independently of the load resistance $R_a$.

Instead of one single resonant coil $L_q$ it is possible to use two or more inductance coils. For instance resonant coils could be placed in the third and eighth stages of a ten-stage generator. In this case several of these "voltage sources" would be present in the circuit.

In the circuit arrangement according to the present invention the transformer has to fulfill a double purpose: First, the transformer represents a voltage source for feeding the lower stages and second, it works as a current transformer in delivering current to the series resonant circuit, which in turn feeds the upper stages.

Further, it should be noted that the inductance of the coil $L_q$, the values of the capacitors C, the frequency of the resonant circuit, the inductance of the transformer and the exact location of the inductance coil cannot be chosen independently from each other.

According to the teachings of the present invention of a low voltage test model was built with 20 stages producing a DC output voltage of 200 kv. This test model had the following characteristics:

C=1.25 microfarads
$C_q$=11.0 picofarads
$V_0$=2$\times$3.7 kv. peak value
Power factor=1.0
Load current=1.0 milliamp
Efficiency=76%
Stored energy=5.0 w.sec.
$L_q$=3.3 henrys It can be seen that while a Greinacher cascade generator would theoretically produce only 148 kv. without a load and using 20 stages with 7.4 kv. as the input voltage peak value, a generator according to the present invention produces even under load conditions an output voltage roughly 35 percent higher than that.

It is thought that the invention and many of its attendant advantages will be understood from the foregoing description and it will be apparent that various changes may be made in the form, construction and arrangement of the parts without departing from the scope of the invention or sacrificing all of its material advantages, the form hereinbefore described being merely a preferred embodiment thereof.

What is claimed is:

1. In a cascade rectifier voltage multiplier for producing an output voltage greater than the product of the input voltage times the number of stages employed and including a transformer having primary and secondary windings, a source of AC energy connected to the primary winding, two parallel columns of series connected capacitors, one end of each column being connected to the transformer secondary winding, and a plurality of rectifiers interconnecting the two columns to form a zig-zag ladder network, the improvement comprising:
   (a) An inductance coil connected between the two columns to form a series LC resonant circuit with the capacitors between the coil and the transformer secondary winding,
   (b) The series LC circuit having a resonant frequency equal to the frequency of the alternating current source.

2. A cascade rectifier voltage multiplier as defined in claim 1 wherein the coil is connected between the two columns approximately midway along their lengths.

References Cited

UNITED STATES PATENTS

| | | | |
|---|---|---|---|
| 2,888,629 | 5/1959 | Everhart et al. | 321—15 |
| 3,259,830 | 7/1966 | Ojelid | 321—15 |
| 3,320,513 | 5/1967 | Cleland | 321—15 |

FOREIGN PATENTS 931,540   8/1955   Germany.

J D MILLER, Primary Examiner

W. H. BEHA, JR., Assistant Examiner

U.S. Cl. X.R.

307—110